United States Patent
Sato et al.

(10) Patent No.: US 7,204,426 B2
(45) Date of Patent: Apr. 17, 2007

(54) METHOD AND SYSTEM FOR SUPPORTING A READER/WRITER

(75) Inventors: Masahiko Sato, Handa (JP); Kiyoshi Takahashi, Hekinan (JP); Takayuki Komatsu, Kariya (JP); Masashi Kamiya, Kariya (JP)

(73) Assignee: Denso Wave Incorporated, Tokyo (JP)

( * ) Notice: Subject to any disclaimer, the term of this patent is extended or adjusted under 35 U.S.C. 154(b) by 175 days.

(21) Appl. No.: 11/116,416

(22) Filed: Apr. 28, 2005

(65) Prior Publication Data

US 2006/0027653 A1    Feb. 9, 2006

(30) Foreign Application Priority Data

Apr. 28, 2004    (JP)    ............................. 2004-133771

(51) Int. Cl.
*G06K 19/06*    (2006.01)
(52) U.S. Cl. .................... 235/492; 235/451; 235/435; 235/380
(58) Field of Classification Search ................ 235/492, 235/451, 380, 435
See application file for complete search history.

(56) References Cited

U.S. PATENT DOCUMENTS

| | | |
|---|---|---|
| 6,400,272 B1 | 6/2002 | Holtzman et al. |
| 6,942,148 B2 * | 9/2005 | Raggam ..................... 235/451 |
| 2004/0110533 A1 * | 6/2004 | Yamagata et al. .......... 455/558 |
| 2005/0108317 A1 * | 5/2005 | Someya et al. ............. 709/200 |
| 2006/0083243 A1 * | 4/2006 | Igarashi et al. ............. 370/392 |

FOREIGN PATENT DOCUMENTS

| | | |
|---|---|---|
| EP | 0 779 520 A2 | 6/1997 |
| JP | 10-198771 | * 7/1998 |
| WO | WO 01/35320 A1 | 5/2001 |

OTHER PUBLICATIONS

Search Report from French Patent Office issued on Mar. 28, 2006 for the corresponding French patent application No. FR 0504318 (a copy thereof).

* cited by examiner

*Primary Examiner*—Steven S. Paik
(74) *Attorney, Agent, or Firm*—Posz Law Group, PLC

(57) ABSTRACT

In a support server communicable with a computer through a network, a first receiving unit is configured to receive a control parameter and communication state data transmitted from a reader/writer, a determining unit is configured to determine an update control parameter based on the received control parameter and the communication state data. In the support server, a second transmitting unit is configured to transmit the determined update control parameter to the reader/writer.

9 Claims, 14 Drawing Sheets

FIG. 4

| | CONTROL PARAMETERS | | REFERENCE VALUE Cn | MEASURED VALUE Dn | SAMPLING NUMBER En | MINIMUM VALUE Fn | AVERAGE VALUE Gn | MAXIMUM VALUE Hn |
|---|---|---|---|---|---|---|---|---|
| | REFERENCE PARAMETER An | ADDITIONAL PARAMETER Bn | | | | | | |
| TRANSMITTED CURRENT | 50 | 0 | 300 | 0 | 0 | 0 | 0 | 0 |
| TRANSMITTED VOLTAGE | **** | **** | **** | **** | **** | **** | **** | **** |
| NOISE | **** | **** | **** | **** | **** | **** | **** | **** |

| | CONTROL PARAMETERS | | REFERENCE VALUE Cn | MEASURED VALUE Dn | SAMPLING NUMBER En | MINIMUM VALUE Fn | AVERAGE VALUE Gn | MAXIMUM VALUE Hn |
|---|---|---|---|---|---|---|---|---|
| | REFERENCE PARAMETER An | ADDITIONAL PARAMETER Bn | | | | | | |
| TRANSMITTED CURRENT | 50 | 0 | 300 | 172 | 254 | 170 | 180 | 190 |
| TRANSMITTED VOLTAGE | **** | **** | **** | **** | **** | **** | **** | **** |
| NOISE | **** | **** | **** | **** | **** | **** | **** | **** |

| | CONTROL PARAMETERS | | REFERENCE VALUE Cn | MEASURED VALUE Dn | SAMPLING NUMBER En | MINIMUM VALUE Fn | AVERAGE VALUE Gn | MAXIMUM VALUE Hn |
|---|---|---|---|---|---|---|---|---|
| | REFERENCE PARAMETER An | ADDITIONAL PARAMETER Bn | | | | | | |
| TRANSMITTED CURRENT | 50 | γ | 300 | 0 | 0 | 0 | 0 | 0 |
| TRANSMITTED VOLTAGE | **** | **** | **** | **** | **** | **** | **** | **** |
| NOISE | **** | **** | **** | **** | **** | **** | **** | **** |

FL

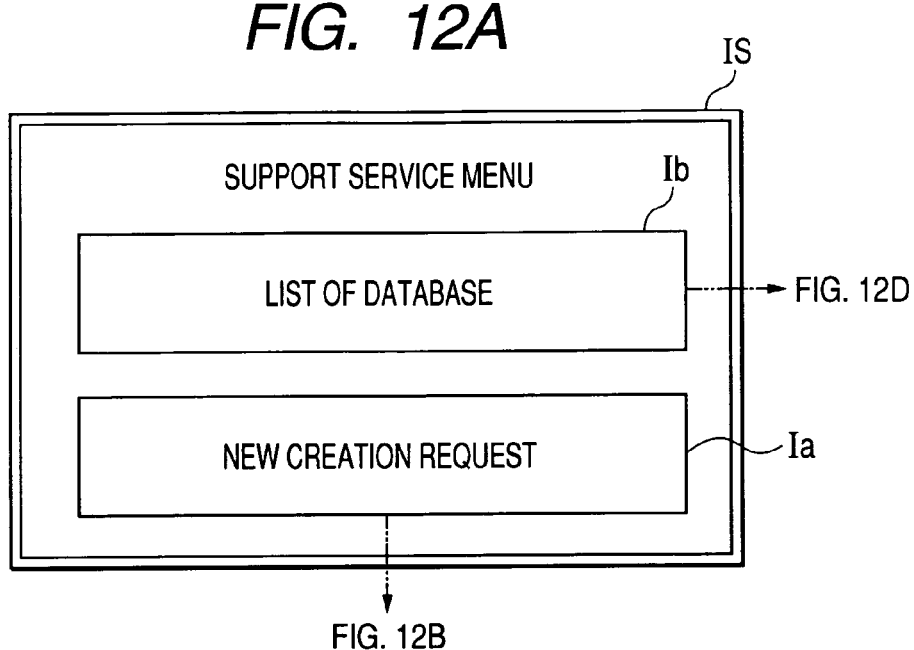

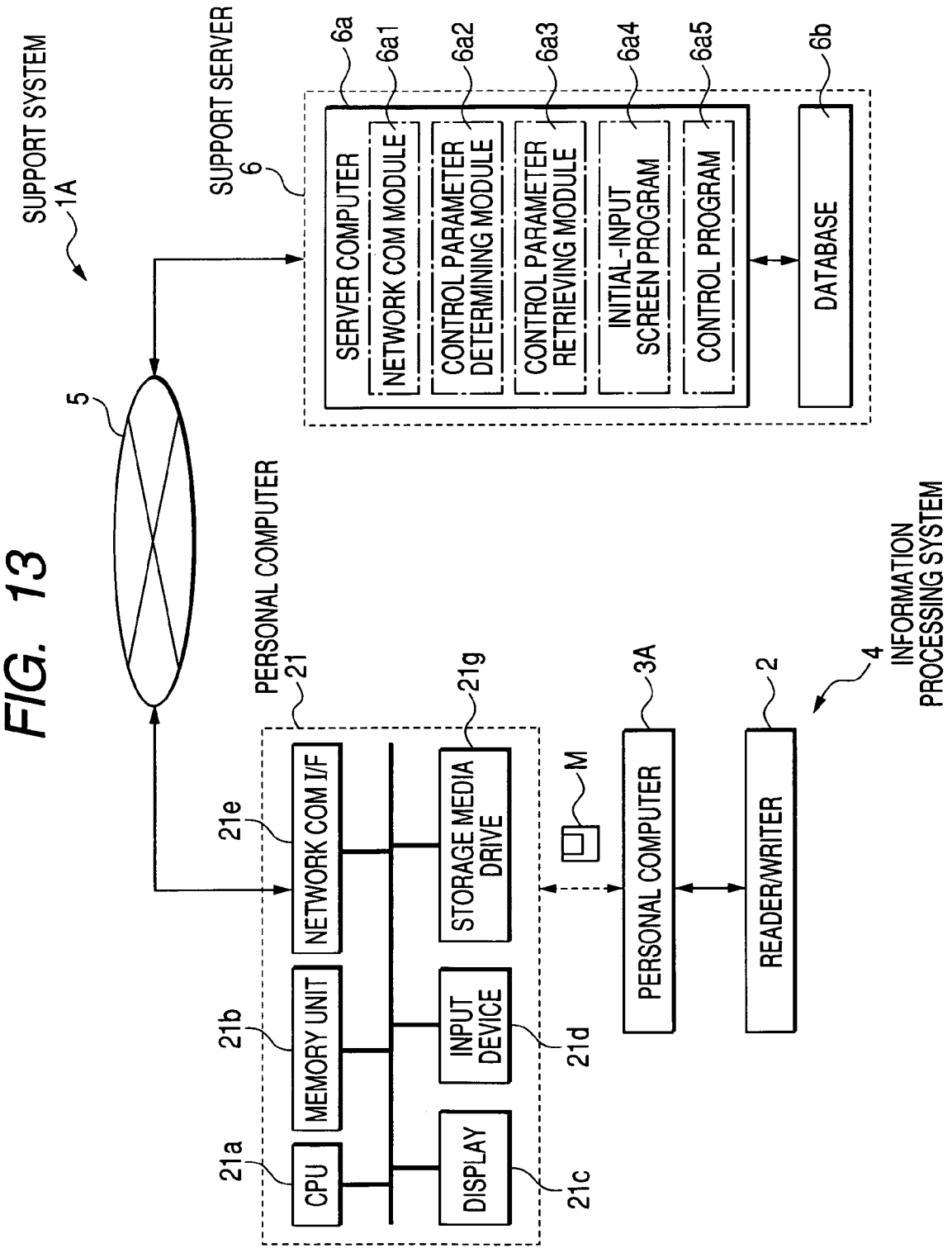

METHOD AND SYSTEM FOR SUPPORTING A READER/WRITER

BACKGROUND OF THE INVENTION

CROSS REFERENCE TO RELATED APPLICATION

This application is based on Japanese Patent Application 2004-133771 filed on Apr. 28, 2004 and claims the benefit of priority therefrom, so that the descriptions of which are all incorporated herein by reference.

1. Field of the Invention

The present invention relates to methods and systems for supporting a reader/writer for wireless communications with noncontact carriers. More particularly, the present invention relates to support methods and systems for maintaining a good communication characteristic of a reader/writer under various environments in which the reader/writer is used.

2. Description of the Related Art

Reader/writers for noncontact IC cards wirelessly communicate with a noncontact IC card or a noncontact IC tag as an information carrier via radio waves, such as electronic waves or electromagnetic waves, to read data stored in the noncontact IC card and to write data thereon. The radio waves have a predetermined frequency range (frequency band).

When a source of transmitting radio waves whose frequency band overlaps that of the radio waves used by a reader/writer is located close thereto, the radio waves transmitted from the source may cause interference with the radio waves communicated between the reader/writer and the noncontact IC card.

In these cases, the reader/writer detects the interference to shift the frequency band of the radio waves to another frequency band, thereby avoiding the interference. A communication system with reader/writer and a noncontact IC card, which has the interference avoiding function set forth above, is disclosed in Japanese Unexamined Patent Publication, No. 10-198771.

Recently, wireless communication systems such as cellular radio phones, wireless local area networks (LANs), and non-contact IC cards have rapidly become widespread, causing their wireless communications to likely interfere with one another. In such a situation, using the communication system with the interference avoiding function disclosed in the Patent Publication may be considered useful.

In addition, the range of applications of noncontact IC cards has rapidly extended with diversification of environments in which reader/writers are used. A reader/writer is susceptible to its surrounding objects, which may cause the communication characteristics thereof with a non-contact IC card to be changed; the communication characteristics include a distance over which the reader/writer and the noncontact IC card can communicate with each other.

Especially, the communication characteristics of a reader/writer are affected by metal parts that are capable of generating an eddy current induced by the radio waves transmitted by the reader/writer.

Dielectrics, such as water, induce heat that may affect the radio waves transmitted by a reader/writer to weaken them, causing the communication characteristics of the reader/writer to vary.

The influences of environments surrounding a reader/writer on the communication characteristics thereof occur independently of the frequencies of the radio waves. Just switching the frequency band of the radio waves, as described in the Publication, may not be to avoid the influences.

Some environments for the usage of a reader/writer may thus significantly reduce the communication coverage of the reader/writer to noncontact IC cards, making the reader/writer impractical.

SUMMARY OF THE INVENTION

The present invention has been made on the background above so that at least one preferable embodiment of the present invention provides a support system capable of keeping good communication characteristics of a reader/writer in cases where the reader/writer is used under different environments.

According to one aspect of the present invention, there is provided a support system comprising a reader/writer for communications with an information carrier. The reader/writer comprises a measuring unit configured to measure communication state data serving as an indicator of a state of the communications with the information carrier, and a first storage unit configured to store the communication state data and a control parameter required to the communications with the information carrier. The reader/writer also comprises a first transmitting unit configured to read out the control parameter and the communication state data to transmit them.

The support system comprises a computer communicable with the reader/writer, the computer comprising a communication unit configured to receive the transmitted control parameter and the communication state data and to transmit the control parameter and the communication state data through a network.

The support system comprises a support server communicable with the computer through the network. The support server comprises a first receiving unit configured to receive the control parameter and the communication state data transmitted via the network from the computer. The support server comprises a determining unit configured to determine an update control parameter based on the received control parameter and the communication state data.

The support server comprises a second transmitting unit configured to transmit the determined update control parameter to the computer. The communication unit of the computer is configured to receive the update control parameter to transmit it to the reader/writer.

The reader/writer further comprises a second receiving unit configured to receive the transmitted update control parameter to update the control parameter stored in the first storage unit to the received update control parameter.

According to another aspect of the present invention, there is provided a support system for a reader/writer capable of communications with an information carrier. The support system comprises a measuring unit configured to measure communication state data serving as an indicator of a state of the communications with the information carrier, and a first storage unit configured to store the communication state data and a control parameter required to the communications with the information carrier. The support system comprises a determining unit configured to read out the communication state data and the control parameter to determine an update control parameter based on the readout control parameter and the communication state data. The support system comprises a control unit configured to control the state of the communications with the information carrier based on the update control parameter and the measured communication state data.

According to a further aspect of the present invention, there is provided a method for supporting a reader/writer capable of communications with an information carrier. The method comprises measuring communication state data serving as an indicator of a state of the communications with the information carrier, and storing the communication state data and a control parameter required to the communications with the information carrier. The method comprises reading out the communication state data and the control parameter to determine an update control parameter based on the readout control parameter and the communication state data. The method comprises controlling the state of the communications with the information carrier based on the update control parameter and the measured communication state data.

BRIEF DESCRIPTION OF THE DRAWINGS

Other objects and aspects of the invention will become apparent from the following description of embodiments with reference to the accompanying drawings in which:

FIG. 4 is a view schematically illustrating a configuration of a communication log file in, for example, table format according to the first embodiment;

FIG. 10 is a view schematically illustrating a configuration of the communication log file when it is uploaded in the support server according to the first embodiment;

FIG. 11 is a view schematically illustrating a configuration of the communication log file when it is updated by the support server according to the first embodiment;

FIG. 12A is a view schematically illustrating an initial-input screen displayed by a personal computer according to the first embodiment;

FIG. 12B is a view schematically illustrating a use-environment information entry screen displayed by the personal computer according to the first embodiment.

FIG. 13 is a schematic diagram illustrating a support system according to a second embodiment of the present invention.

DETAILED DESCRIPTION OF THE PREFERRED EMBODIMENTS

First Embodiment

Figure 1:
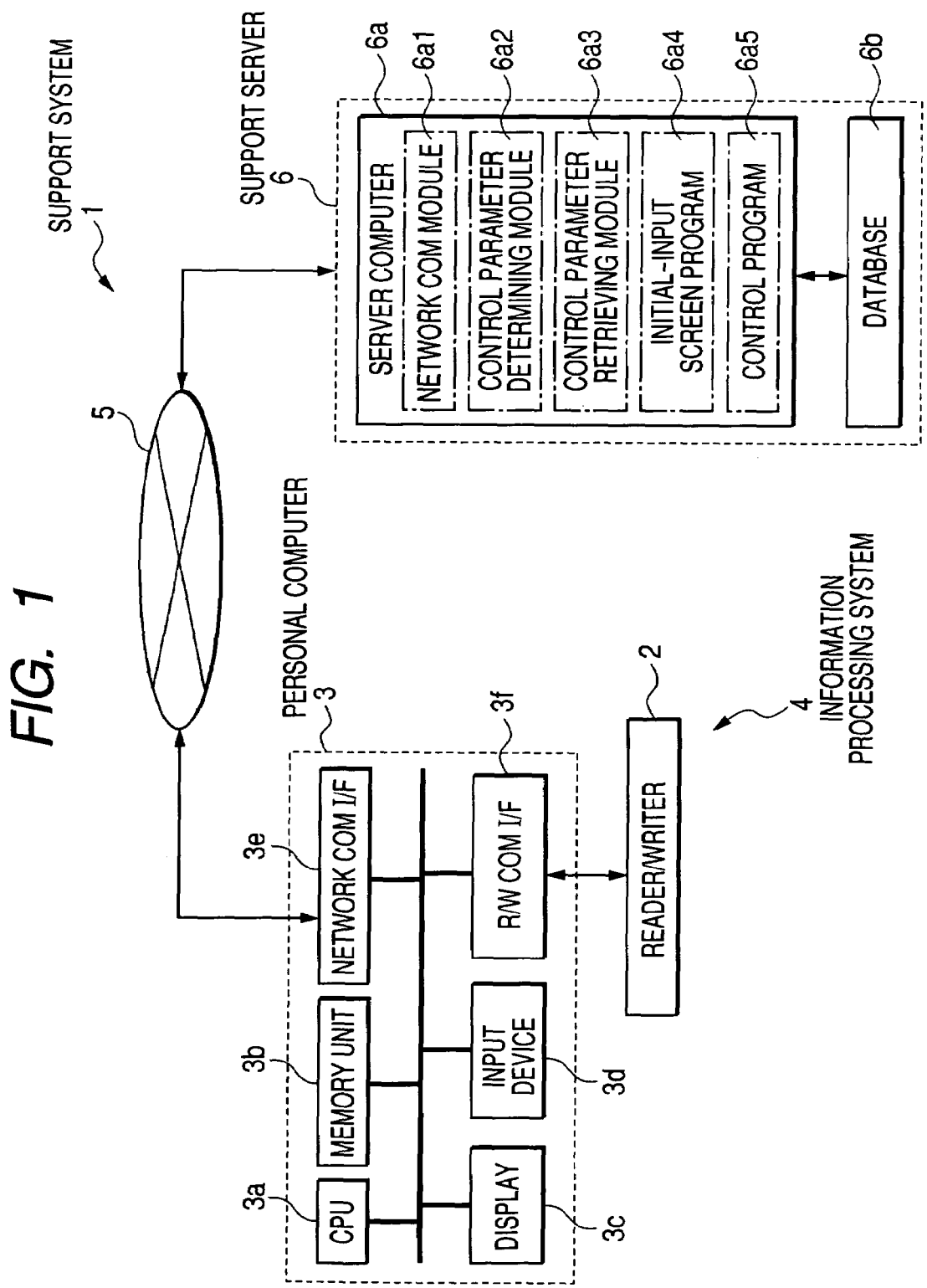
FIG. 1 is a schematic diagram illustrating a support system according to a first embodiment of the present invention.

With reference to FIGS. 1 to 12, the first embodiment of the present invention will be described below. FIG. 1 shows a schematic diagram of a support system 1. The support system 1 includes an information processing system 4 including a reader/writer 2 and a computer such as a personal computer 3, a wide-area network 5 such as the internet, and a support server 6.

The reader/writer 2 is operative to wirelessly communicate with a non-contact IC card C as an example of non-contact information carriers to receive/provide (read/write) necessary information from/to the noncontact carrier 30 via radio waves. The reader/writer 2 is connected to the personal computer 3 as wired or wireless connections; this reader/writer 2, for example, serves as an input-output device for the personal computer.

Figure 2:
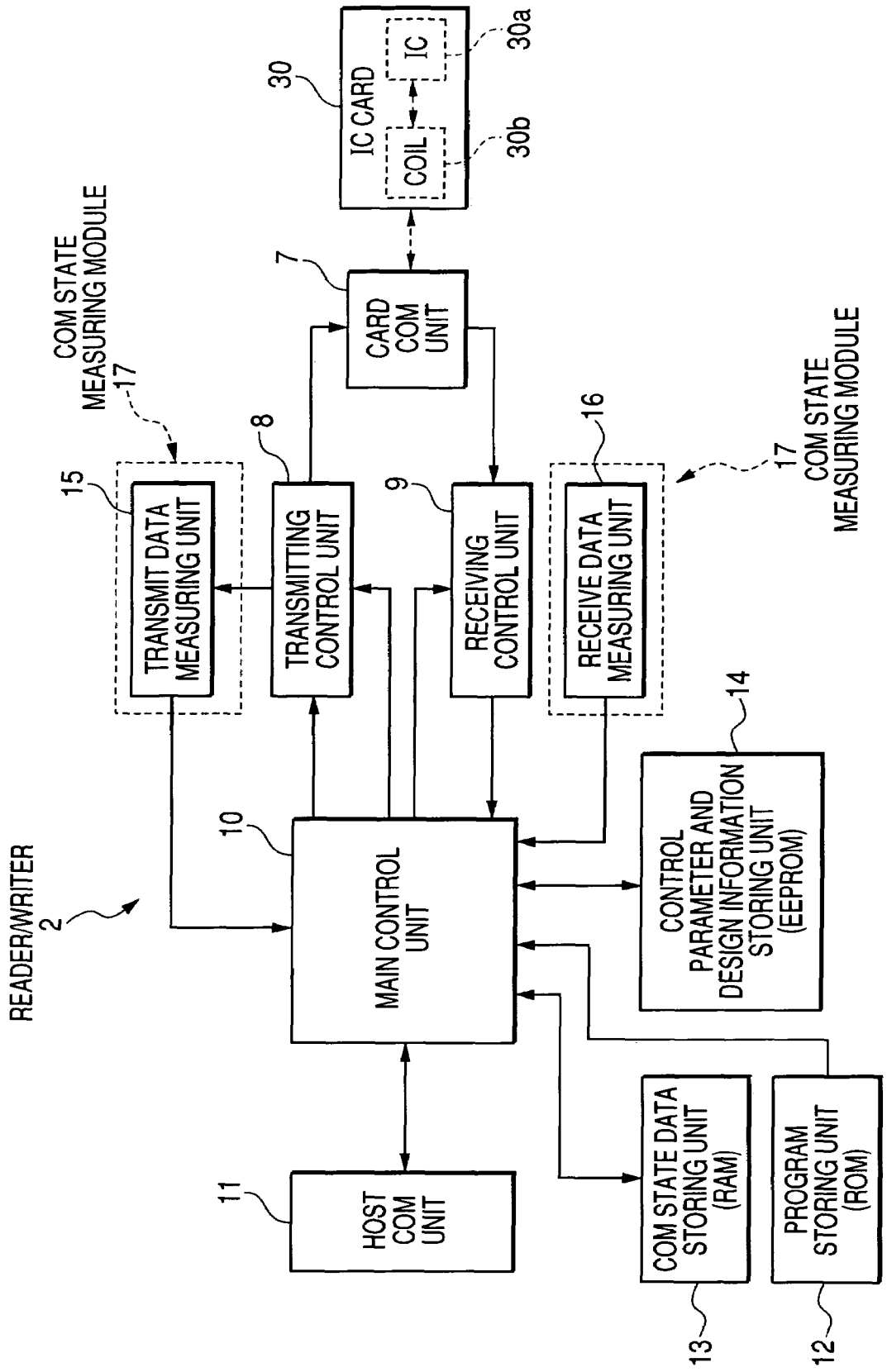
FIG. 2 is a functional/hardware block diagram of a reader/writer illustrated in FIG. 1.

FIG. 2 shows a functional/hardware block diagram of the reader/writer 2. The reader/writer 2 is provided with, as hardware elements, a CPU, a ROM, a RAM, an EEPROM, a communication interface (I/F) including, for example, an antenna coil, and the like, and cooperative operations of the hardware elements provide the following functional blocks (units).

Specifically, as shown in FIG. 2, the reader/writer 2 includes a card communication unit 7 operative to communicate with the non-contact IC card 30, a transmitting control unit 8, and a receiving control unit 9. The reader/writer 2 includes a main control unit 10, a host communication unit 11, a program storing unit 12, a communication state data storing unit 13, and a control parameter and design information storing unit 14.

In addition, the reader/writer 2 includes a transmit data measuring unit 15, and a receive data measuring unit 16. The transmit data measuring unit 15 and the receive data measuring unit 16 serve as a communication state measuring module 17. In FIGS. 1 and 2, the term "communication" is abbreviated to "com".

The main control unit 10 is implemented mainly in, for example, the CPU; this main control unit 10 performs overall control of the reader/writer 2. Specifically, in the first embodiment, the main control unit 10 executes, for example, a default control parameter setting process, a card information process, a host command process, and a feedback monitoring process.

The transmitting control unit 8 is operative to modulate a high-frequency carrier wave (electromagnetic carrier wave) for electric power supply based on data containing a command such as a query, a connection request, or the like, and to feed the modulated carrier wave to the card communication unit 7. The card communication unit 7 is operative to transmit the modulated carrier wave on which the command(s) is superimposed to the non-contact IC card 30 through the antenna coil; this antenna coil is illustrated as reference numeral 7a in FIG. 3.

The non-contact IC card 30 is provided with, for example, an IC (integrated circuit) 30a and a transmitting/receiving antenna coil 30b electrically connected to the IC 30a. The IC 30a includes, for example, a rectifying circuit, a detection circuit, a modem, a control unit, and a memory. Specifically, the carrier wave transmitted from the reader/writer 2 is received by the transmitting/receiving antenna coil 30b so that the coil 30b generates AC voltage) therethrough by, for example, electromagnetic induction.

The AC voltage is rectified by the rectifying circuit to generate DC voltage for operating the IC 30a. The data superimposed on the carrier wave is detected by the detection circuit, and the data is demodulated by the modem, so that the control unit analyzes the demodulated data to execute operations based on the analyzed result. The IC 30a is operative to modulate a return signal with predetermined response data corresponding to the command superimposed on the transmitted data and to transmit the modulated return signal through the antenna coil 30b.

The return signal transmitted from the noncontact IC card 30 is received by the card control unit 7 through the antenna coil 7a, and the received return signal is sent to the receiving control unit 9.

The receiving control unit 9 is operative to receive the return signal to amplify the return signal by a predetermined gain to demodulate the response data from the return signal. The demodulated response data is supplied to the main control unit 10, so that the main control unit 10 analyzes the response data. The analyzed response data is sent from the main control unit 10 to the personal computer 3 through the host communication unit 11.

In addition, the program storing unit 12 is implemented mainly in, for example, the ROM. The program storing unit 12 is configured to store at least one program composed of instructions that allow the main control unit 10 to execute the overall control of the reader/writer 2. The program storing unit 12 is configured to store data required to execute the instructions.

The communication state data storing unit 13 is implemented mainly in, for example, the RAM. The communication state data storing unit 13 is configured to temporally store communication state data measured by the communication state measuring module 17. The communication state data serves as an indicator of a state of the communications with the IC card 30, allowing the main control unit to monitor the state of the communications with the IC card 30.

The control parameter and design information storing unit 14 is implemented mainly in, for example, the EEPROM. The control parameter and design information storing unit 14 is configured to rewritably store control parameters and previously store design information, such as the type and the serial number of the reader/writer 2; this design information can specify the design feature of the reader/writer 2. The ROM 12 may store the design information.

The transmit data measuring unit 15 is operative to repeatedly measure, as the communication-state data, transmitting characteristic data a first sampling number of times and to provide the measured communication state data to the main control unit 10 for feedback monitoring every sampling timing. The transmitting characteristic data can include an output voltage (transmitted voltage) of the carrier wave currently transmitted from the transmitting control unit 8 and an output current (transmitted current) of the carrier wave. In the first embodiment, the transmitted voltage and the transmitted current are used as the transmitting characteristic data.

The receive data measuring unit 16 is operative to repeatedly measure, as the communication-state data, receiving characteristic data a second sampling number of times, thereby feeding the communication state data to the main control unit 10 for the feedback monitoring every sampling timing. The receiving characteristic data can include a level of the return signal received by the receiving unit 9, a noise level contained in the return signal, and/or the gain. In the first embodiment, the noise level is used as the receiving characteristic data.

Specifically, the main control unit 10 is operative to store currently measured transmitting characteristic data in the RAM 13 and to compare the currently measured value of the transmitting characteristic data with the transmitting characteristic data values that have been stored in the RAM 13.

In addition, the main control unit 10 is operative to, when the currently measured value of the transmitting characteristic data is larger than the maximum one in all of the transmitting characteristic data values that have been stored in the RAM 13, update the maximum data value to the currently measured value. Similarly, the main control unit 10 is operative to, when the currently measured value of the transmitting characteristic data is smaller than the minimum one in all of the transmitting characteristic data values that have been stored in the RAM 13, update the minimum data value to the currently measured value.

Moreover, the main control unit 10 is operative to, when the currently measured value of the receiving characteristic data is larger than the maximum one in all of the receiving characteristic data values that have been stored in the RAM 13, update the maximum data value to the currently measured value.

Similarly, the main control unit 10 is operative to, when the currently measured value of the receiving characteristic data is smaller than the minimum one in all of the receiving characteristic data values that have been stored in the RAM 13, update the minimum data value to the currently measured value.

The main control unit 10 is further operative to calculate the average of the transmitting characteristic data values measured at the first sample times to store in the RAM 13. Similarly, the main control unit 10 is operative to calculate the average of the receiving characteristic data values measured at the second sample times to store it in the RAM 13. Incidentally, the maximum data values, the minimum data values, and the averages can be stored in the EEPROM 14.

When a communication-state data request is sent from the personal computer 3 to the reader/writer 2, the main control unit 10 is operative to receive the request. In response to the request, the main control unit 10 is operative to send the control parameters, the communication-state data including the maximum and minimum data values and the average values to the personal computer 3.

As shown in FIG. 1, the personal computer 3 is provided with a CPU 3a, a memory unit 3b, a display 3c, an input device 3d, a network communication interface I/F 3e, and a reader/writer (R/W) communication I/F 3f; these elements 3a to 3e are communicably connected to each other through buses.

The memory unit 3b includes a ROM, a RAM, and a hard disc drive. The input device 3d includes a keyboard and a pointing device; this input device allows a user to click clickable areas of images displayed on the screen of the display 3c and to enter data in entry areas of the images displayed thereon.

The network communication I/F 3e allows the CPU 3a to communicate with various devices including the support server 6 that establish connection with the wide-area network 5. The reader/writer communication I/F 3f allows the CPU 3a to communicate with the reader/writer 2.

The support server 6 is provided with a server computer 6a whose hardware structure is substantially identical with that of the personal computer 3. The support server 6 is also provided with a database 6b communicably connected to each other. The support server 6 is operative to support the information processing system 4 (the reader/writer 2 and the personal computer 3) through the wide-area network 5 to maintain a good communication characteristic of the information processing system 4.

The database 6b includes a plurality of control parameters that are categorized based on corresponding types of reader/writers, and that categorized based on use-environments of the reader/writers.

The server computer 6a is provided functionally with a network communication module 6a1 that allows the server computer 6a to communicate with the personal computer 3 establishing connection with the wide-area network 5 therethrough. The server computer 6 is also provided functionally with a control-parameter determining module 6a2 for determining control parameters to be used for the reader/writer 2, and a control-parameter retrieving module 6a3 for retrieving control parameters from the database 6b.

In addition, the server computer 6 is provided with an initial-input screen program 6a4 composed of instructions that allow the personal computer 3 (CPU 3a) to generate an initial-input screen and display it on the display 3c. The server computer 6 is provided with a control program 6a5 composed of instructions that allow the personal computer 3 (CPU 3a) to execute an uploading process, described hereinafter, and the like.

Figure 3:
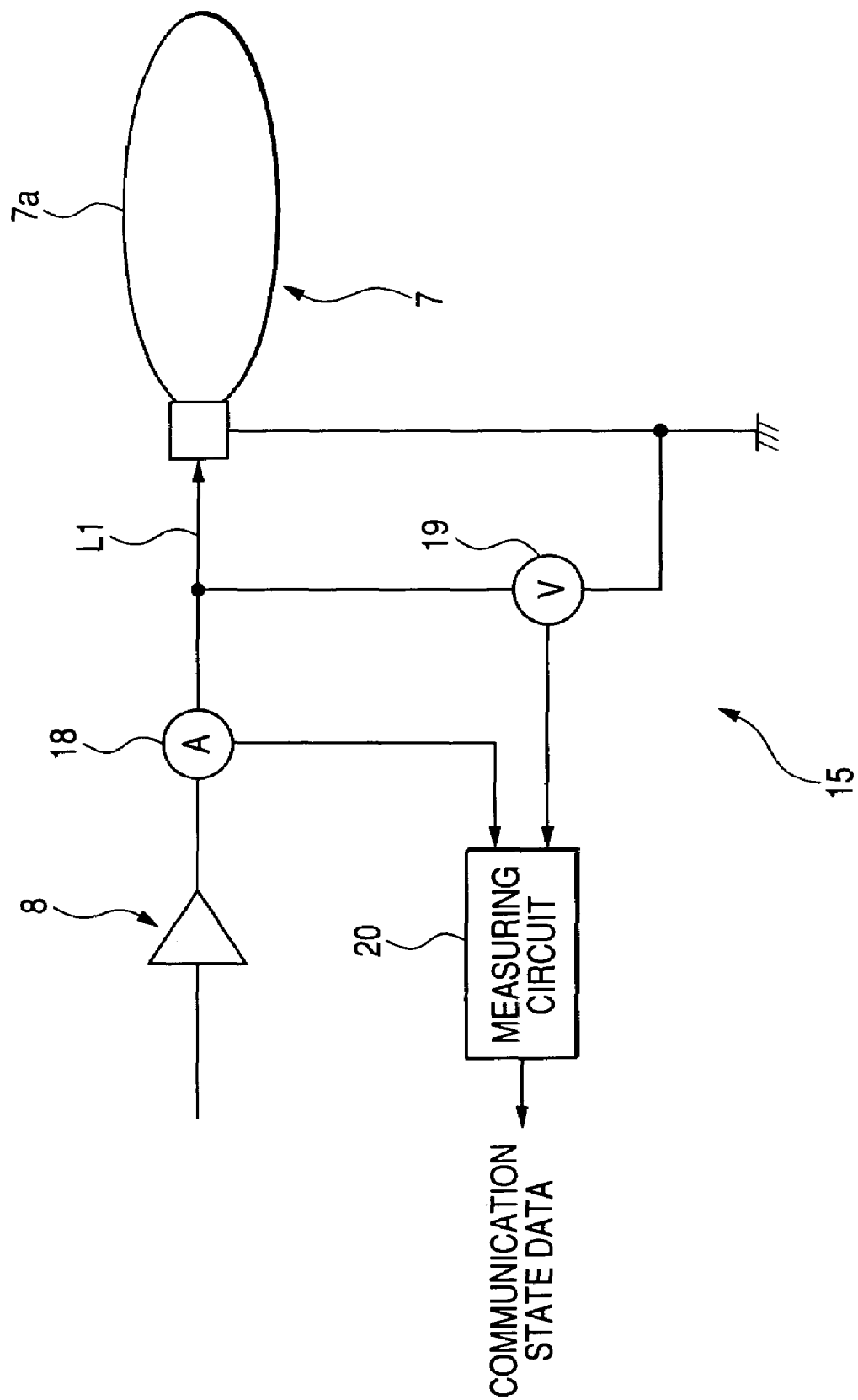
FIG. 3 is a circuit diagram illustrating a structural example of a transmit data measuring unit according to the first embodiment of the present invention.

FIG. 3 shows a structural example of the transmit data measuring unit 15 according to the first embodiment of the present invention. In FIG. 3, the transmit data measuring unit 15 is provided with a current sensor 18 electrically connected to a power supply line L1 connecting between the transmitting control unit 8 and the antenna coil 7a of the card communication unit 7, The current sensor 18 is configured to sense the output current (transmitted current) of each carrier wave transmitted from the transmitting control unit 8 at the first sampling number of times.

The transmit data measuring unit 15 is also provided with a voltage sensor 19 electrically connected between the power supply line L1 and a ground (GND). The voltage sensor 19 is configured to sense the output voltage (transmitted voltage) of each carrier wave transmitted from the transmitting control unit 8 at the second sampling number of times.

The transmit data measuring unit 15 is further provided with a measuring circuit 20 electrically connected to the current sensor 18 and the voltage sensor 19. The measuring circuit 20 is configured to measure the transmitted current detected by the current sensor 18 and the transmitted voltage detected by the voltage sensor 19 to supply the measured current and voltage to the main control unit 10 as the transmitting characteristic data (the communication-state data).

The receive data measuring unit 16 is, for example, configured to detect the noise level, such as a level of a standing-wave noise, contained in each return signal received by the receiving unit 9, thereby supplying the detected standing-wave noise level as, for example, the receiving characteristic data (the communication-state data).

In addition, in the first embodiment, the main control unit 10 is operative to record, in the RAM and/or EEPROM, a communication log file LF based on transactions of the reader/writer 2 (see FIG. 4).

Specifically, the communication log file LF includes, as logs pertaining to the transmitted current, the control parameters, a reference current value C1, a currently measured value (currently measured current) D1 by the transmit data measuring unit 15, the first sample number E1 corresponding to the transmitted current, a minimum value F1, an average value G1, and a maximum value H1.

For example, the control parameters pertaining to the transmitted current include a reference parameter A1. The reference parameter A1 allows the transmitted current, which is measured by the transmit data measuring unit 15 of the reader/writer 2 under a reference environment before shipment thereof, to meet the reference current value (absolute value) C1, such as 300, of the standard performance predetermined under the reference environment.

It is to be noted that the reference environment means an ideal environment surrounding the reader/writer 2 wherein the reader/writer 2 is used at ordinary temperatures while no metallic portions are located therearound and no specific environmental noises are measured.

Let us suppose that, for example, the minimum adjusting range for measuring the current, in other words, the current measuring resolution of the reader/writer 2 is "6". In this case, the reference current value is represented by the following equation [1]:

$$C1 = MAR \times A1 + B1 \qquad [1]$$

where C1 is the reference current value, MAR is the minimum adjusting range, and B1 is an additional parameter B1.

Specifically, the control parameters pertaining to the transmitted current includes the additional parameter B1 for complementing a theoretical transmitted current value based on the C1 and the MAR so that the theoretical transmitted current value can match with the reference current value even under various environments surrounding the reader/writer 2.

For example, when the reader/writer 2 is used under the reference environment, the additional parameter B1 becomes zero, so that the reference current value C1 of 300 is given by 300=MAR (=6)×A1+B1(=0), resulting in the reference parameter A1 of "50".

As described above, under the reference environment, the value "50", the value "0", and the value "300" are set as the initial values of the reference parameter A1, the additional parameter B1, and the reference current value C1 to be stored in the communication log file LF, respectively.

Moreover, for example, the initial values of "0" are set to the measured value D1, the sampling number E1, the minimum value F1, the average value G1, and the maximum value H1, respectively, to meet the standard performance of the reader/writer 2 under the reference environment.

The communication log file LF includes, as logs pertaining to the transmitted voltage, the control parameters, a reference voltage value C2, a currently measured value (currently measured voltage) D2 by the transmit data measuring unit 15, the first sample number E2 corresponding to the transmitted voltage, a minimum value F2, an average value G2, and a maximum value H2.

As well as the transmitted current, the control parameters relating to the transmitted voltage include a reference parameter A2. The reference parameter A2 allows the transmitted voltage, which is measured by the transmit data measuring unit 15 of the reader/writer 2 under the reference environment before shipment thereof, to meet a reference voltage value (absolute value) C2 predetermined under the reference environment, In addition, the control parameters pertaining to the transmitted voltage include an additional parameter B2. The additional parameter B2 allows complement of a theoretical transmitted voltage value based on the C2 and a minimum adjusting range (voltage measuring resolution) MVR of the reader/writer 2 so that the theoretical transmitted voltage value can match with the reference voltage value even under various environments surrounding the reader/writer 2. That is, the reference voltage value C2 is represented by the following equation [2];

$$C2 = MVR \times A2 + B2 \qquad [2]$$

In a similar manner with the transmitted current, predetermined initial values are set to the reference parameter A2, the additional parameter B2, the reference value C2, the measured value D2, the sampling number E2, the minimum value F2, the average value G2, and the maximum value H2, respectively. These initial values, for example, allow the performance of the reader/writer 2 to meet the standard performance thereof under the reference environment.

Moreover, the communication log file LF includes, as logs pertaining to the noise level, the control parameters, a reference noise level C3, a currently measured noise level D3 by the receive data measuring unit 16, the second sample number E3 corresponding to the noise level, a minimum value F3, an average value G3, and a maximum value H3.

As well as the transmitted current and voltage, the control parameters relating to the noise level include a reference parameter A3. The reference parameter A3 allows the noise level, which is measured by the receive data measuring unit 16 of the reader/writer 2 under the reference environment before shipment thereof, to meet the reference voltage value (absolute value) C3 predetermined under the reference environment.

In addition, the control parameters pertaining to the transmitted voltage include an additional parameter B3 for complementing a theoretical transmitted voltage value based on the C3 and a minimum adjusting range (noise-level measuring resolution) MNR of the reader/writer 2 so that the theoretical noise level can match with the reference noise level even under various environments surrounding the reader/writer 2. That is, the reference noise level C3 is represented by the following equation [3]:

$$C3 = MNR \times A3 + B3 \qquad [3]$$

In a similar manner with the transmitted current and voltage, for example, predetermined initial values are set to the reference parameter A3, the additional parameter B3, the reference value C3, the measured value D3, the sampling number E3, the minimum value F3, the average value G3, and the maximum value H3, respectively. These initial values allow the performance of the reader/writer 2 to meet the standard performance thereof under the reference environment.

Figure 5:
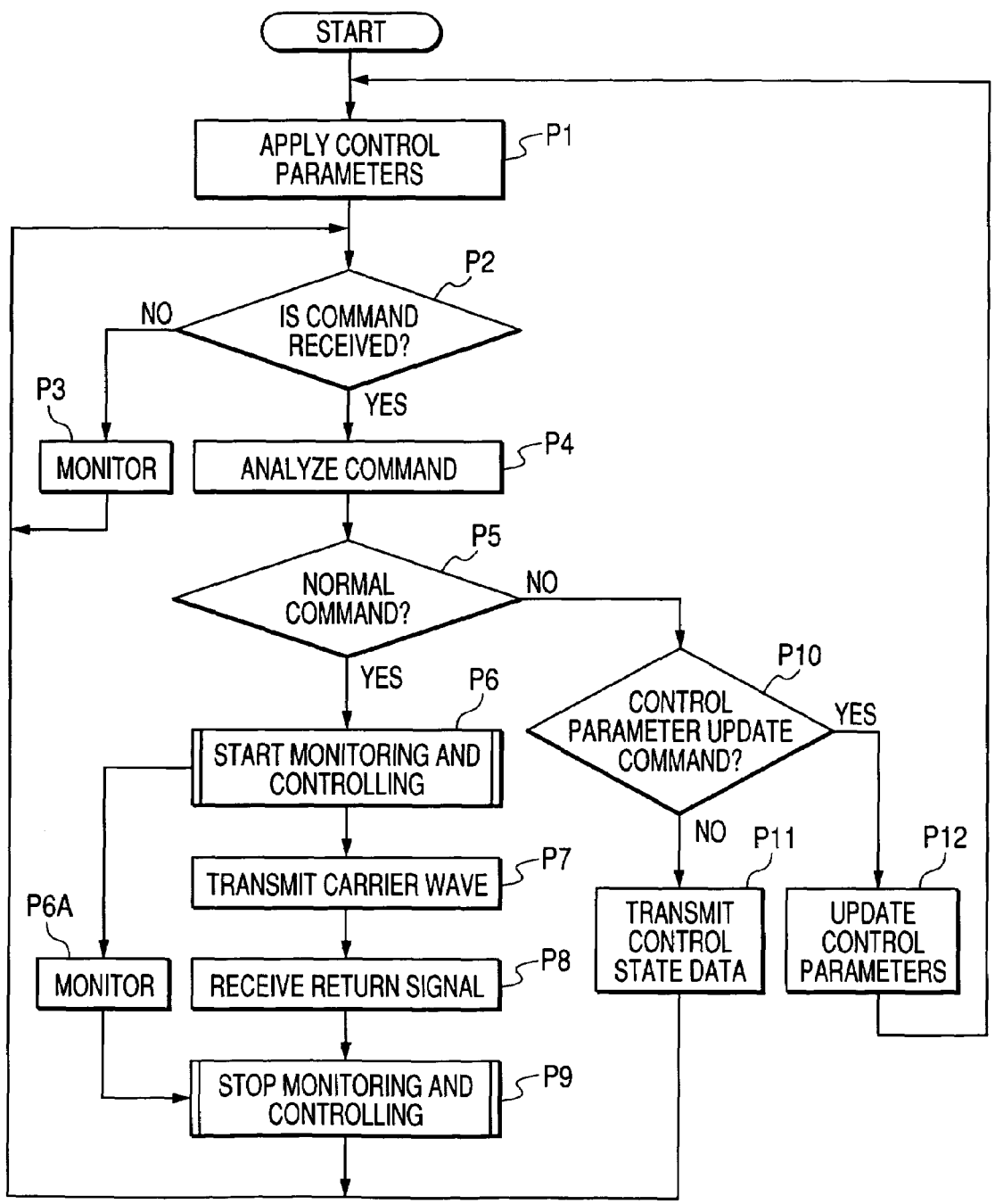
FIG. 5 is a flowchart schematically illustrating operations of the reader/writer according to the first embodiment.

Turning now to FIG. 5, the operations of the main control unit 10 of the reader/writer 2 will be described hereinafter.

When a power supply (not shown) of the reader/writer 2 is turned on to start communications with the noncontact IC card 30, the main control unit 10 applies the control parameters currently stored in the communication log file LF to control the transmitting control unit 8 and the receiving control unit 9 (step P1).

Specifically, the main control unit 10 reads out the control parameters (the reference parameters A1 to A3 and the additional parameters B1 to B3) stored in the communication log file FL, Subsequently, the main control unit 10 supplies the control parameters A1, A2, B1, and B2 for the transmitted current and the transmitted voltage to the transmitting control unit 8, and supplies the control parameters A3 and B3 for the noise level to the receiving control unit 9.

Next, the main control unit 10 determines whether to receive a command from the personal computer 3 through the host communication unit 11 in step P2, and when receiving no commands from the personal computer 3 (the determination in step P2 is NO), the main control unit 10 monitors whether to receive noises or the like (step P3).

When receiving at least one command from the personal computer 3 (the determination in step P2 is YES), the main control unit 10 analyzes the at least one command (step P4). When the at least one command is one of normal commands, such as a command for requesting the reader/writer 2 to communicate with the IC card 30 (the determination in step P5 is YES), the main control unit 10 starts to monitor and control the communication state data (step P6).

While monitoring and controlling the communication state data (step P6A), the main control unit 10 controls the transmitting control unit 8 so that the transmitting control unit 8 transmits the carrier wave containing at least one command to the IC card 30 through the card communication unit 7 based on the control parameters A1, A2, B1, and B2 (step P7).

Specifically, for example, the transmitting control unit 8 controls the carrier wave so that the transmitted current and voltage become the reference current and voltage defined by the equations [1] and [2] based on the control parameters A1, A2, B1, and B2.

After that, the main control unit 10 controls the receiving control unit 9 to receive the return signal transmitted from the IC card 30 through the card communication unit 7 and to subject the received return signal to filtering processes based on the control parameters A3 and B3 (step P8).

After receiving of the return signal, the main control unit 10 stops the monitoring and controlling of the communication state data (step P9).

Figure 6:
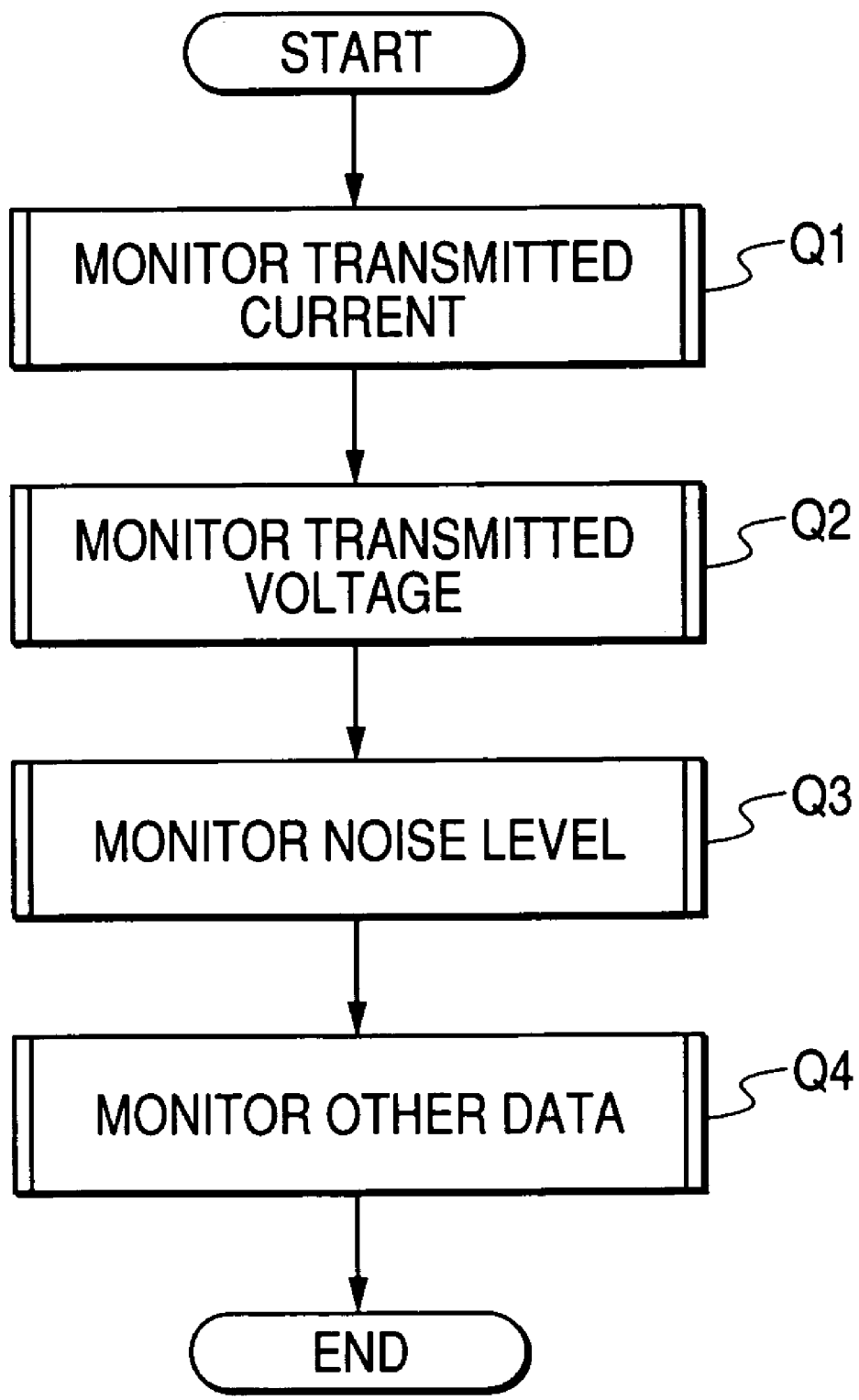
FIG. 6 is a flowchart schematically illustrating an example of monitoring and controlling operations of the reader/writer according to the first embodiment.

In step Q1 of FIG. 6, when starting the monitoring and controlling of the communication state data, the main control unit 10 fetches sequentially the repeatedly measured transmitted currents from the transmit measuring unit 15; these transmitted currents correspond to the carrier wave transmitted by the operation in step P7. In step Q1, the main control unit 10 executes the monitoring operation based on the fetched transmitted currents.

In step Q2, for example, in parallel with the operation in step Q1, when starting the monitoring and controlling of the communication state data, the main control unit 10 fetches sequentially the repeatedly measured transmitted voltages from the transmit measuring unit 15; these transmitted voltages correspond to the carrier wave transmitted by the operation in step P7. In step Q2, the main control unit 10 executes the monitoring operation based on the fetched transmitted voltages.

In step Q3, when receiving the return signal by the operation in step P8, the main control unit 10 fetches sequentially the repeatedly measured levels of the standing-wave noise contained in the return signal. In step Q3, the main control unit 10 executes the monitoring operation based on the fetched noise levels.

Figure 7:
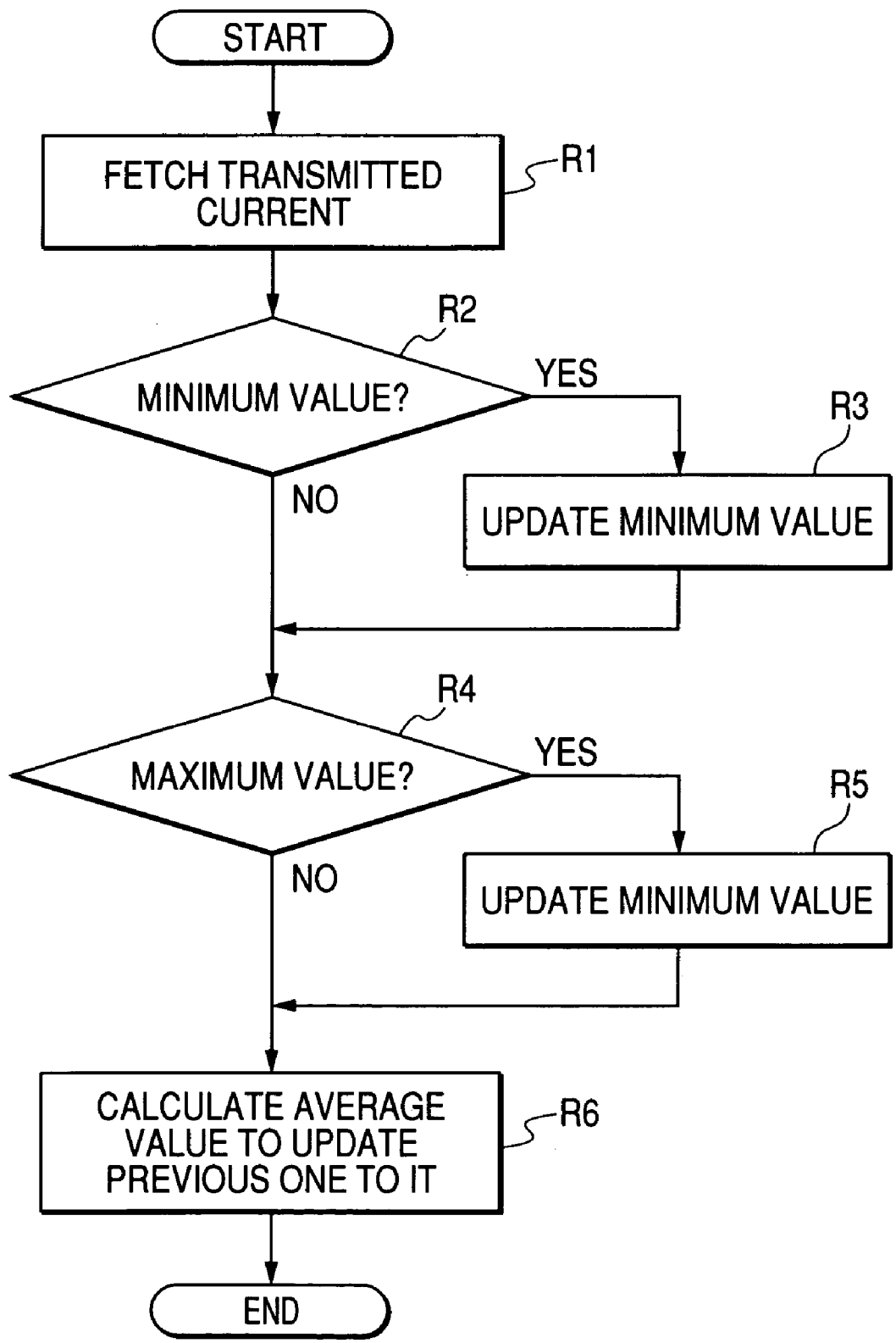
FIG. 7 is a flowchart schematically illustrating an example of monitoring operations of the reader/writer shown in step Q1 of FIG. 6 according to the first embodiment.

Specifically, when executing the monitoring operation in step Q1, the main control unit 10 fetches the currently measured transmitted current to store the currently measured value of the transmitted current as the measured current value D1 in the communication log file LF to update it (FIG. 7; step R1). Subsequently, the main control unit 10 determines whether the updated current value D1 is lower than the minimum value F1 stored in the communication log file LF (step R2).

When it is determined that the updated current value D1 is lower than the minimum value F1 (the determination in step R2 is YES), the main control unit 10 updates the minimum value F1 to the updated current value D1, shifting to step R4.

When it is determined that the updated current value D1 is not lower than the minimum value P1 (the determination in step R2 is NO), the main control unit 10 determines whether the updated current value D1 is higher than the maximum value H1 stored in the communication log file LF (step R4).

When it is determined that the updated current value D1 is higher than the maximum value H1 (the determination in step R4 is YES), the main control unit 10 updates the maximum value H1 to the updated current value D1.

For example, the main control unit 10 repeatedly executes the operations in steps R1 to R4 every sampled transmitted current.

After that, the main control unit 10 calculates the average of all of the sampled transmitted current values fetched by the repeat operations to update the average value G1 stored in the communication log file LF to the calculated average value (step R6).

Subsequently, for example, the main control unit 10 compares the updated average value G1 with the reference current value C1 in the communication log file LF to determine whether the updated average value G1 substantially coincides with the reference current value C1.

When it is determined that the updated average value G1 does not substantially coincide with the reference current value C1, the main control unit 10 controls the carrier wave based on the control parameters A1 and B1 so that a next updated average value will substantially coincide with the reference current value C1, terminating the processes shown in FIG. 7. On the other hand, when it is determined that the updated average value G1 substantially coincides with the reference current value C1, the main control unit 10 terminates the processes shown in FIG. 7.

In addition, when executing the monitoring operation in step Q2, the main control unit 10 executes operations similar to the operations in steps R1 to R6, thereby updating the minimum value F2, the maximum value H2, and the average value G2 in the communication log file LF.

Furthermore, when executing the monitoring operation in step Q3, the main control unit 10 executes operations similar to the operations in steps R1 to R6, thereby updating the minimum value F3, the maximum value H3, and the average value G3 in the communication log file LF.

In contrast, when the at least one command is not one of normal commands, such as a command for requesting setting of the control parameters (the determination in step P5 is NO), the main control unit 10 proceeds to step P10.

In step P10, the main control unit 10 determines whether the at least one command is a command for requesting update of the control parameters. When the at least one command is not the command for requesting update of the control parameters (step P10→NO), the main control unit 10 reads out the control parameters, the communication state data (particularly, the average values G1 to G3, the minimum values F1 to F3, and the maximum values H1 to H3), and use-environment information in step P11. Subsequently, in step P11, the main control unit 10 returns the readout control parameters and the communication state data to the personal computer 3.

In the first embodiment, when the control parameters, the communication state data, and the use—environment information are transmitted to the personal computer 3, which is accessible with the support server 6, receives the control parameters, the communication state data, and the use-environment information to transmit them to the support server 6 via the wide-area network 5. This allows the personal computer 3 to obtain from the support server 6 new control parameters based on the transmitted control parameters, the communication state data, and the use-environment information.

Specifically, a user operates the input device 3d to cause the personal computer 3 (CPU 3a) to access the support server 6 through the wide-area network 5, the support server 6 downloads to the personal computer 3 the initial-input screen program 6a4 stored therein.

The personal computer 3 (CPU 3a) receives the initial-input screen program 6a4 and generates an initial-input screen (support service menu screen) IS part of which is clickable to display it on the display 3c (see FIG. 12A) in accordance with the instructions of the initial-input screen program 6a4.

As shown in FIG. 12A, the initial-input screen IS includes a first clickable area Ia constituting "NEW CREATION REQUEST" input section, and a second clickable area Ib constituting "DATABASE LIST" input section Ib. The input wait state of the "NEW CREATION REQUEST" input section Ia corresponds to the request waiting operation by the support server 6 shown in step S1 and the request presence/absence determination operation thereby shown in step S2 (see FIG. 8).

Figure 8:
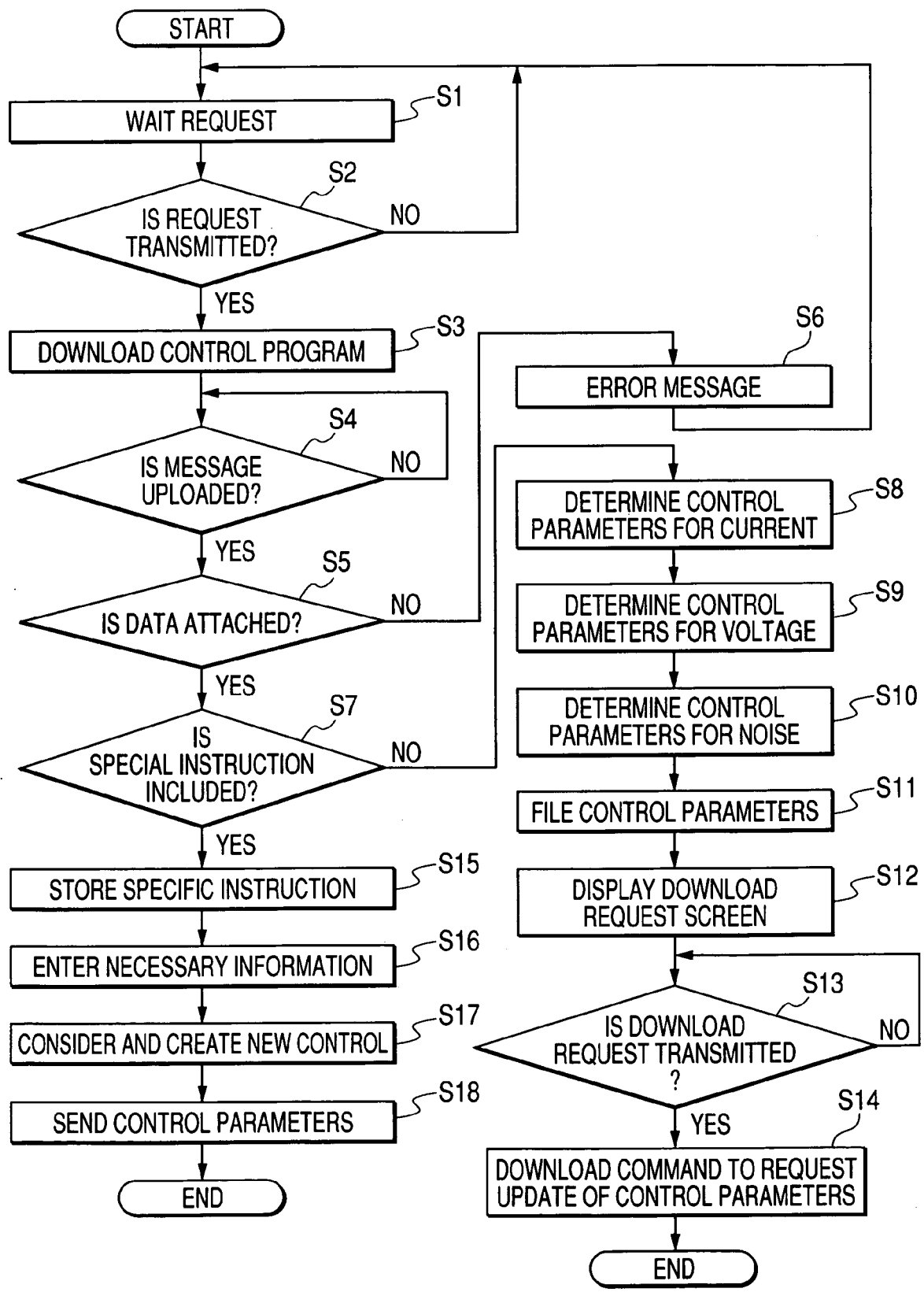
FIG. 8 is a flowchart schematically illustrating operations of a support server according to the first embodiment.

When, therefore, the "NEW CREATION REQUEST" input section Ia is clicked with the input device 3d by the user, the determination in step S2 is YES, so that the operations after step S2 in FIG. 8 will be executed by the server computer 6a (support server 6). The following description is given with reference to the flowchart in FIG. 8 and display screen including the screen IS in FIG. 12.

When the "NEW CREATION REQUEST" Ia is clicked, the request is transmitted to the support server 6 as the control-program download request.

When the request is transmitted to the support serer 6, the determination of the support server 6 in step S2 is YES, so that the support server 6 downloads to the personal computer 3 the control program 6a5 for transmitting to the support server 6 the control parameters, the communication state data, and the use-environment information in step S3.

The personal computer 3 receives the downloaded control program 6a5 to load it in the memory unit 3b. The personal computer 3 generates a use-environment information entry screen DS1 part of which is clickable to display it on the display 3c (see FIG. 12B) in accordance with the instructions of the control program 6a5.

As shown in FIG. 12B, in the use-environment information screen DS1, an attachment command area Ic, a communication-log file name entry area Id, "surrounding environment" checkboxes Ie, "metal presence/absence" checkboxes If, "how to use" checkboxes Ig, and "card type" checkboxes Ih are graphically provided.

The "surrounding environment" checkboxes Ie include a first checkbox (first option) that allows specification such that the environment surrounding the reader/writer 2 corresponds to an office environment. The "surrounding environment" checkboxes Ie includes a second checkbox (second option) that allows specification such that the environment surrounding the reader/writer 2 corresponds to an embedded environment. The "surrounding environment" checkboxes Ie includes a third checkbox (third option) that allows specification such that the environment surrounding the reader/writer 2 corresponds to an outdoor environment.

The "metal presence/absence" checkboxes If include a first checkbox (first option) that allows specification such that a metal part is located within 10 mm from the reader/writher 2, and a second checkbox (second option) that allows specification such that a metal part is located within 20 mm from the reader/writher 2.

The "metal presence/absence" checkboxes If include a third checkbox (third option) that allows specification such that a metal part is located at a distance of 50 mm and over with respect to the reader/writher 2, and a fourth checkbox (fourth option) that allows specification such that no metal parts are located around the reader/writher 2.

The "how to use" checkboxes Ig include a first checkbox (first option) that allows specification such that a noncontact IC card is used to be fixed, and a second checkbox (second option) that allows specification such that a noncontact IC card is used to touch the reader/writer 2 to communicate therebetween. The "how to use" checkboxes Ig include a third checkbox (third option) that allows specification such that a noncontact IC card is used to touch a predetermined position of a housing of the reader/writher 2 while a user goes to communicate between the noncontact IC card and the reader/writer 2.

The "card type" checkboxes Ih include first, second, third, and fourth checkboxes (first, second, third, and fourth options) that allow the types A, B, C, and tag based on the communication standard ISO/IEC14443 to be specified, respectively. A special instruction entry area Ii allows a special instruction, such as user noticed points and/or user's inquiry, to be entered.

A "OK" button Ij that allows check marks selectively described in the checkboxes to be confirmed.

Specifically, the user operates the input device 3d to enter the file name of the communication log file LF, and to click the attachment command area Ic. The click of the attachment command area Ic causes the personal computer 3 to attach the communication log file LF corresponding to the entered file name in the area Id to this message.

In addition, after at least one check box has been marked in each of the first to fourth check boxes Ie to Ih and/or the special instruction has been described in the special instruction entry area Ii, the user operates the input device 3d to click the "OK" button Ij. The click of the "OK" button Ij causes the personal computer 3 to generate the use-environment information corresponding to the mark of the at least one check box in each of the first to fourth check boxes Ie to Ih. Thereafter, the personal computer 3 attaches the use-environment information to the message to which the communication log file LF has been attached, thereby uploading the message to the support server 6.

The support server 6 determines whether the message is uploaded in step S4 of FIG. 8. When it is determined that the message is uploaded from the personal computer 3 (step S4→YES), the support server 6 determines whether the communication log file LF (the control parameters, the communication state data) and the use-environment information are attached to the message in step S5.

When it is determined that none of the control parameters, the communication state data, and the use-environment information is attached to the message (step S5→NO), the support server 6 indicates an error massage on the display 3c in step S6.

When it is determined that the communication log file LF (the control parameters and the communication state data), and the use-environment information are attached to the message (step S5→YES), the support server 6 stores the uploaded data in a memory unit or the database 6b and determines whether the special instruction is included in the use-environment information in step S7.

When it is determined that no special instruction is included in the use-environment information (step S7→NO), the support server 6 executes, as the operations of the control parameter determining module 6a2, new control parameters determining operations in steps S8 to S10 based on the uploaded communication log file LF and the use-environment information; for example, this uploaded log file LF is shown in FIG. 10.

That is, the support server 6 determines new control parameters A1 and B1 related to the transmitted current in step S8, and determines new control parameters A2 and B2 related to the transmitted voltage in step S9. In addition, the support server 6 determines new control parameters A3 and B3 related to the noise level in step S10.

Figure 9:
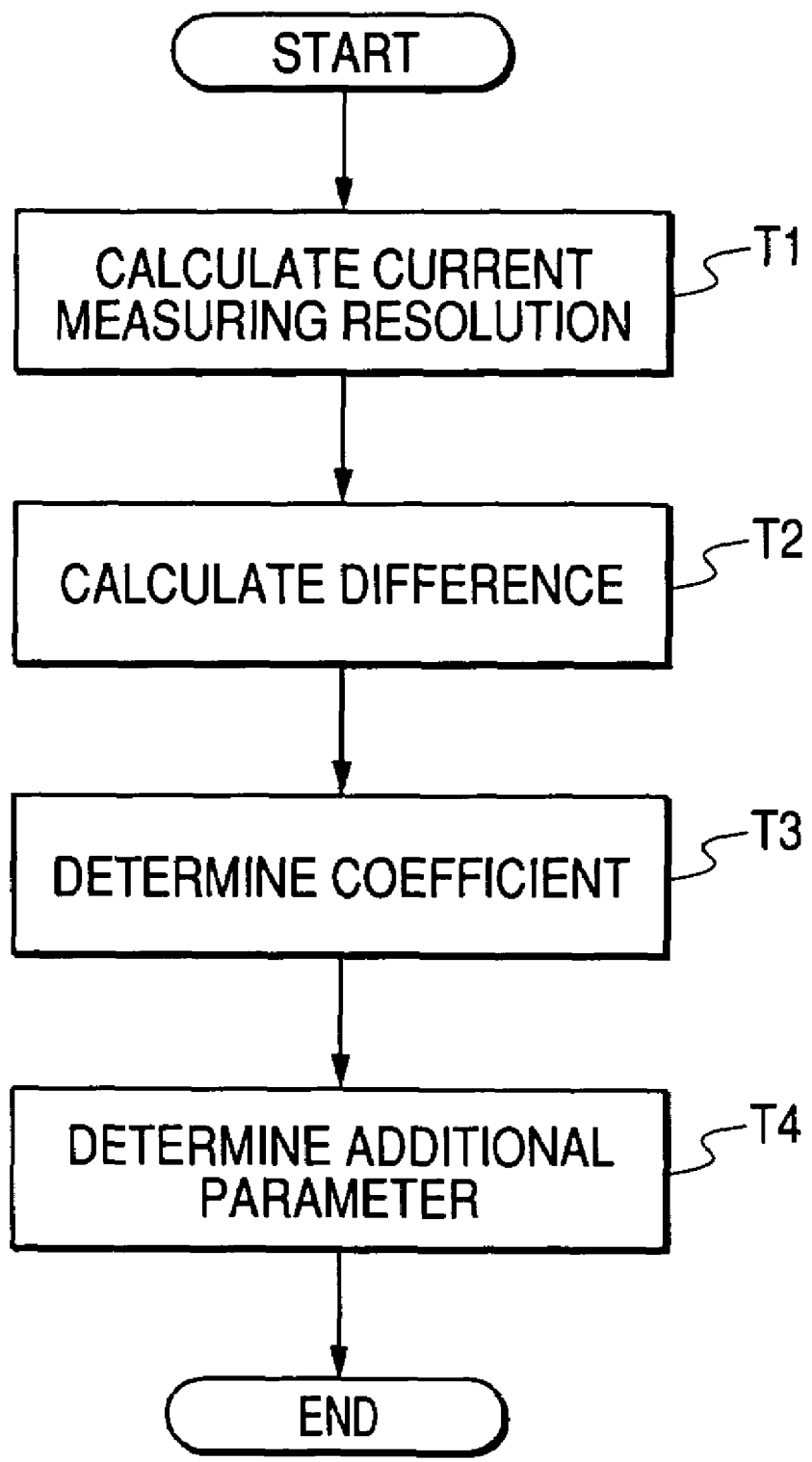
FIG. 9 is a flowchart schematically illustrating an example of determining operations of the support server shown in step S8 of FIG. 8 according to the first embodiment.

Specifically, when executing the determination process in step S8, the support server 6 calculates the current measuring resolution (MAR) based on the following equation by using the reference parameter A1 and the reference current value C1 in step T1 of FIG. 9:

$$MAR = \text{reference current value } C1/\text{the reference parameter } A1 \quad [4]$$

Next, the support server 6 calculates a difference based on the following equation in step T2:

$$\text{difference} = \text{the reference current value } C1 - \text{the average value } G1 \quad [5]$$

Subsequently, the support server 6 determines a coefficient k in step T3. In the first embodiment, the support server 6 determines that the value of the coefficient k is "4" when marking the first checkbox in the "metal presence/absence" checkboxes If, in other words, when selecting that "a metal part is located within 10 mm from the reader/writher 2".

Similarly, the support server 6 determines that the value of the coefficient k is "3" when marking the second checkbox in the "metal presence/absence" checkboxes If, in other words, when selecting that "a metal part is located within 20 mm from the reader/writher 2". In addition, the support server 6 determines that the value of the coefficient k is "2" when marking the third checkbox in the "metal presence/absence" checkboxes If, in other words, when selecting that "a metal part is located at a distance of 50 mm and over with respect to the reader/writher 2".

Furthermore, the support server 6 determines that the value of the coefficient k is "1" when marking the fourth checkbox in the "metal presence/absence" checkboxes If, in other words, when selecting that "no metal parts are located around the reader/writher 2".

After the value of coefficient k has been determined, the support server 6 determines a new value γ1 of the additional parameter B1 based on the following equation in step T4:

$$\gamma 1 = (\text{difference}/MAR) \times \text{coefficient} \quad [6]$$

The support server 6 updates the value of the additional parameter B1 stored in the communication log file LF to the determined value γ1 of the additional parameter B1, and to clear the data values D1 to H1 with keeping the reference current value C1 (see FIG. 11).

That is, in the first embodiment, the coefficient k provides the value γ1 of the additional parameter B1 that conforms with the currently calculated average value G1 and the use-environment information.

Note that the above-described MAR (resolution), the difference, and the value γ1 of the additional parameter B1 are obtained in a manner illustrated by way of a convenient example.

Likewise, the support server 6 determines a value γ2 of the additional parameter B2 for the transmitted voltage (step S9 in FIG. 8), and a γ3 of the additional parameter B3 for the noise level (step S10). The support server 6 files the new values γ1 to γ3 of the control parameters B1 to B3 in step S11 of FIG. 8. For example, the support server 6 updates the values of the control parameters B1 to B3 stored in the communication log fail LF to the new values γ1 to γ3, respectively.

Figure 12C:
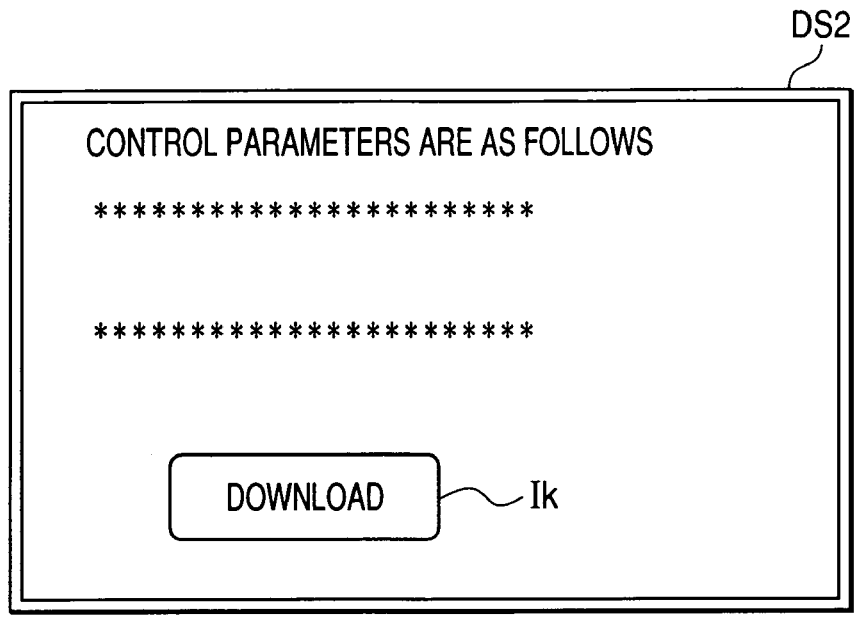
FIG. 12C is a view schematically illustrating a download request screen displayed by the personal computer according to the first embodiment.

Subsequently, the support server 6 causes the personal computer 3 to display, based on the network communication module 6a1, a control-parameter download request screen DS2 on the display 3c in step S12. As shown in FIG. 12C, in the download request screen DS2, a clickable area Ik that allows the computer 3 to request for downloading the retrieved control parameter is graphically displayed, and the contents of the update values of the control parameters are graphically displayed to prompt the user to click the clickable area Ik.

When the user operates the input device 3d to click the clickable area Ik, the personal computer 3 requests the support server 6 to download the update values of the control parameters.

After the operation in step S12, the support server 6 repeatedly determines whether the download request is transmitted from the personal computer 2 (step S13).

When it is determined that the download request is transmitted from the personal computer 3 (step S13→YES), the support server 6 downloads, to the personal computer 3, the command for requesting update of the control parameters, to which the communication log file LF including the updated values γ1 to γ3 is attached (step S14). The persona computer 3 transmits the download communication log file LP to the reader/writer 1 in response to the command sent from the support server 6.

When the at least one command is the command for requesting update of the control parameters (step P10→YES in FIG. 5), the main control unit 10 receives the communication log fail LF to obtain the updated values γ1 to γ3 attached to the update requesting command in step P12. In step P12, the main control unit 10 updates the control parameters currently stored in the communication log file LF to the corresponding updated control parameter values γ1 to γ3. As a result, the main control unit 10 can apply the newly updated control parameters stored in the communication log file LF to control the transmitting control unit 8 and the receiving control unit 9 in step P12.

In contrast, when it is determined that the special instruction is included in the use-environment information (step S7→YES), the support server 6 stores the special instruction in the memory unit or the database 6b and displays the special instruction on a display in step S15.

An administrator visually recognizes the special instruction displayed on the display to operate an input device, thereby entering necessary information related to the special instruction to the support server 6 in step S16. In addition, the administrator considers and creates new control parameters to meet the special instructions on the support server 6 in step S17, so that the support server 6 sends the newly created control parameters to the personal computer 3 by E-mail in step S18, or the administrator sends them to the user by mail.

The control parameters can be obtained in a different way as follows. When the "DATABASE LIST" input section Ib is clicked with the input device by the user, the request is transmitted to the support server 6.

Figure 12D:
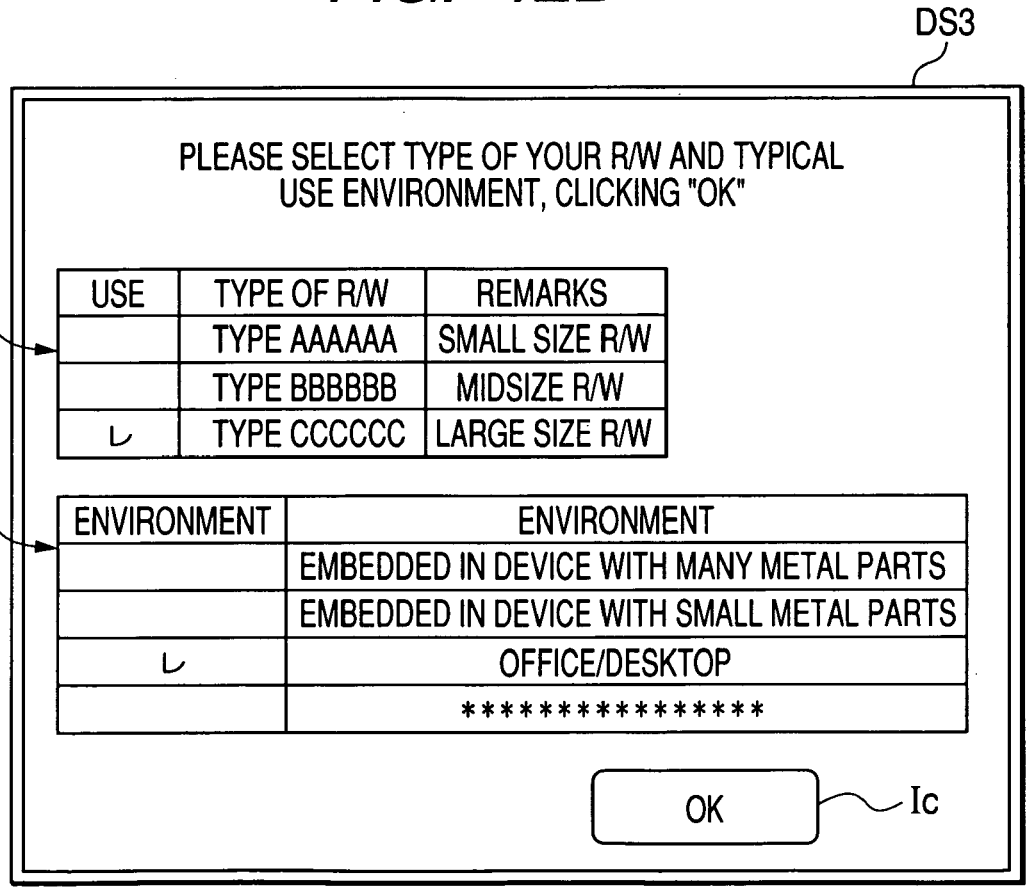
FIG. 12D is a view schematically illustrating a type and use-environment selection screen displayed by the personal computer according to the first embodiment.

The support server 6 downloads, as shown in FIG. 12D, a type and use-environment selection screen DS3 including a type-input section Im, a use-environment input section In of the reader/writer 2, and an "OK" button Io.

The user operates the input device 3d to enter the type of the reader/writer 2 being used on the type-input section Im, and to enter the use-environment surrounding the reader/writer 2 being used on the use-environment input section In, thereby clicking the "OK" button Io.

The input information (the type of the reader/writer 2 and the use-environment thereof) is transmitted from the personal computer 3 to the support server 6.

The support server 6, as the operations of the control parameter retrieving module 6a3, retrieves at least one control parameter that corresponds to the entered type and use-environment from the database 6b. After that, the support server 6 causes the personal computer 3 to display, based on the network communication module 6a1, the download request screen DS2 on the display 3c.

As shown in FIG. 12C, in the download request screen DS2, a clickable area Ik that allows the computer 3 to request for downloading the retrieved control parameter is graphically displayed, and the contents of the retrieved values of the control parameters are graphically displayed to prompt the user to click the clickable area Ik.

As a result, it is possible for the personal computer 3 to obtain the control parameters that meet the type of the reader/writer 2 and the use-environment thereof from the communication log file LF As described above, according to the first embodiment of the present invention, the reader/writer 2 controls, during wireless communications with the non-contact IC card 30, the transmitted voltage and current to become the reference values (target values) C1 and C2 based on the control parameters A1, A2, B1, and B2 for the transmitted current and voltage.

In addition, the reader/writer 2 also controls the noise level contained in the return signal from the IC card 30 to become the reference value (target value) C3 according to the control parameters A3 and B3 for the noise level In particular, in the first embodiment, some use environments of the reader/writer 2 may cause a trouble to the communications with the IC card 30 According to the first embodiment, the reader/writer 2 measures the communication state data such as the transmitted current, transmitted voltage, and received noise level. In response to the request from the personal computer 3 for transmitting the communication state data, the reader/writer 2 transmits to the personal computer 3 the measured communication state data and the control parameters used in the relevant reader/writer 2. The personal computer 3 then transmits the data and the parameters to the support server 6 via the wide-area communication network 5. The support server 6, specifically, its control parameter determining module 6a2, determines the optimum control parameters based on the uploaded communication state data and the control parameters. The support server 6 then returns the optimum control parameters to the personal computer 3 as the new control parameters for the reader/writer 2. The personal computer 3 transmits the control parameters fitted in well with the current communication state to the reader/writer 2. The reader/writer 3 therefore updates (stores) the new control parameters and communicates with the IC card 30 based on the new (updated) control parameters.

The reader/writer 2 can adapt the controlled variables, such as the transmitted current, transmitted voltage, and noise level to the corresponding reference values, respectively. This makes it possible to improve the communication characteristics of the reader/writer 2 with the non-contact IC card 30 for the various use environments.

As described above, in the first embodiment, it is possible to change the operating characteristics of the reader/writer 2 by, for example, remote control and to maintain the good communication characteristics of the reader/writer 2 for the variety of the installation environments thereof.

Furthermore, according to the first embodiment, the personal computer 3 receives the communication state data and the control parameters from the reader/writer 2, and subsequently adds, to the data and the parameters, the use environment information (use conditions) of the reader/writer 2, which are actually entered by the user. The personal computer 3 then transmits the combined data to the support server 6. The support server 6 determines the optimum control parameters based on the combined data including the communication state data and the control parameters as well as the use environment information.

The support server 6 can thus determine the control parameters which are suitable for the use environment of the reader/writer 2. The support server 6 can therefore change the operating characteristics of the reader/writer 2 according to its use environment.

Moreover, in the first embodiment, it is possible for the personal computer 3 to obtain the control program 6a5 without previously storing it. This allows the communication characteristics of the reader/writer 2 to be easily improved with user-friendliness.

Furthermore, in the first embodiment, it is possible for the user to easily select (click) one of the "surrounding environment" checkboxes Ie, one of the "metal presence/absence" checkboxes If, one of the "how to use" checkboxes Ig, and one of the "card type" checkboxes Ih on the use-environment information screen DS1 displayed in the display 3c. This allows the user to easily entry the use-environment information of the reader/writer 2 into the personal computer 3 and the support server 3.

Second Embodiment

FIG. 13 shows a support system 1A according to a second embodiment of the present invention, In the second embodiment, the support system 1A a is provided with a personal computer 21 whose elements 21a to 21e are substantially identical with the elements 3a to 3e of the personal computer 3 shown in FIG. 1. In particular, the personal computer 21 has a storage media drive 21g. In addition, a personal computer 3A, which is identical with the personal computer 3 in the first embodiment, has a storage media drive 3g.

When the personal computer 3A cannot access the support server 6, the relevant personal computer 3 may obtain the communication state data and the control parameters from the reader/writer 2. Subsequently, the personal computer 3A store the data and parameters in a storage medium M such as a floppy disk, a rewritable disk, and a stick-type memory by using the storage media drive 3g.

The personal computer 21, which can access the support server 6, may then transmit from the storage medium M the data and the parameters to the support server 6 through the storage media drive 21g. The personal computer 21, therefore, can obtain the communication state data and the control parameters to upload them to the support sever 6 via the wide-area network 5, and can receive and store the optimum control parameters downloaded from the support server 6 in a storage medium M which can transfer the optimum control parameters to the personal computer 3A.

The support systems according to the present invention may have a plurality of information processing systems each including at least one reader/writer and a computer for control thereof.

The first and second embodiments of the present invention may be modified, for example, as follows. The reader/writer 2 stores the design information in its nonvolatile memory 14. The reader/writer 2 may add the design information to the communication state data and the control parameters, and transmits the combined data to the personal computer 3. In this case, the personal computer 3 transmits to the support server 6 the combined data including the control parameters, design information, and the use environment information.

The support server 6 uses as a basis the communication state data, control parameters, design information, and use environment information to determine the optimum control parameters. The control parameters can be determined in various manners other than by the above-described calculations.

The control parameter can be determined, for example, by storing in the database 6b the control parameters for the communication state data, searching in the database 6b the control parameters corresponding to the communication status data, and determining the searched control parameters as the optimum control parameters. The coefficient associated with the use environment information may adequately be modified according to the actual conditions.

The non-contact information carrier may be the non-contact IC tag. The transmitting characteristic data may include a transmitted frequency of the carrier wave other than the transmitted current and voltage. The receiving characteristic data may include a level of the return signal and the gain by which the return signal is amplified.

In the first and second embodiments, the reader/writer 2 compares the updated average value based on the sampled communication-state values with the corresponding reference value in the communication log file LF to determine whether the updated average value substantially coincides with the reference value. In the present invention, however, when the average value is different from the deviation obtained by the sampled values, it is possible to amend the average value based on the maximum value and the minimum value.

In addition, the accuracy of the average value depends on the sampling number of the corresponding communication-state data values, so that it is possible to amend the average value based on the maximum value and the minimum value depending on the sampling number.

Furthermore, in the first and second embodiments, the support server 6 determines the value of the coefficient k based on the "metal presence/absence" information that are entered by the user as the use-environment information (see FIG. 12B and steps S8–S10 of FIG. 8)

The present invention, however, is not limited to the structure. Accordingly, the support server 6 can determine the value of the coefficient k based on the "how to use" information and the "card type" information, which are entered by the user as the use-environment information. For example, because powers to be used by IC cards depend on the "how to use" information and the "card type" information of their cars, the support server 6 can adjust the value of the coefficient k based on the card type of IC card 30 and based on how to use it.

In addition, the support server 6 can prepare control parameters for noise so that they are suitable for the different surrounding environments that entered by the user as the "surrounding environment" information of the use-environment information. In this case, it is possible for the reader/writer 2 to subject the received return signal to filtering process based on the control parameters for noise, which are selected to be suitable for the surrounding environment of the reader/writer 2.

In the first and second embodiments, the personal computer 3 and the support server 6 communicate with each other through the wide-area network 5, but they may communicate with each other through a local area network, such as a wire/wireless LAN.

In the first and second embodiments, the operations in steps S8 to S12 can be executed by the personal computer 3 and/or the reader/writer 2. In these cases, the personal computer 3 and/or the reader/writer 2 can constitute the support systems according to the present invention.

In the first and second embodiments, the user clicks one of the checkboxes displayed in the display 3*c* so as to entry the use-environment information of the reader/writer 2 into the personal computer 3 and the support server 3. The present invention, however, is not limited to the structure. Specifically, the personal computer can display clickable and/or enterable areas in a different format with respect to the checkboxes. This allows the user to easily click and/or input items of use-environment information on the clickable and/or enterable areas so as to entry the items of use-environment information of the reader/writer 2 into the personal computer 3 and the support server 3.

While there has been described what is at present considered to be these embodiments and modifications of the present invention, it will be understood that various modifications which are not described yet may be made therein, and it is intended to cover in the appended claims all such modifications as fall within the true spirit and scope of the invention.

What is claimed is:

1. A support system comprising:
 a reader/writer for communications with an information carrier, the reader/writer comprising:
  a measuring unit configured to measure communication state data serving as an indicator of a state of the communications with the information carrier;
  a first storage unit configured to store the communication state data and a control parameter required to the communications with the information carrier; and
  a first transmitting unit configured to read out the control parameter and the communication state data to transmit them;
 a computer communicable with the reader/writer, the computer comprising:
  a communication unit configured to receive the transmitted control parameter and the communication state data and to transmit the control parameter and the communication state data through a network; and
 a support server communicable with the computer through the network, the support server comprising:
  a first receiving unit configured to receive the control parameter and the communication state data transmitted via the network from the computer;
  a determining unit configured to determine an update control parameter based on the received control parameter and the communication state data; and
  a second transmitting unit configured to transmit the determined update control parameter to the computer, the communication unit of the computer being configured to receive the update control parameter to transmit it to the reader/writer,
 wherein the reader/writer further comprises:
  a second receiving unit configured to receive the transmitted update control parameter to update the control parameter stored in the first storage unit to the received update control parameter.

2. A support system according to claim 1, wherein the computer further comprises:
 an entry unit configured to enter use environment information representing an environment surrounding the reader/writer being used, the communication unit being configured to transmit the entered use environment information in addition to the control parameter and the communication state data through the network, and
 wherein the first receiving unit of the support server is configured to receive the use environment information in addition to the control parameter and the communication state data, and the determining unit of the support server is configured to determine the update control parameter based on the received control parameter, the communication state data, and the use environment information.

3. A support system according to claim 2, wherein the support sever further comprises:
 a program download unit configured to download a control program to the computer in response to a download request sent from the computer, the control program allowing the communication unit of the computer to add the entered use environment information to the control parameter and the communication state data and to transmit them to the support server through the network.

4. A support system according to claim 3, wherein the control program allows the computer to display a use-environment information entry screen a display thereof, the use-environment information entry screen including a plurality of options related to the use-environment information that allow the entry unit of the computer to select at least one option, thereby entering an item of the use-environment information corresponding to the at least one option.

5. A support system according to claim 1, wherein the reader/writer further comprises:
 a second storage unit configured to store design information of the reader/writer, the design information specifying a design feature of the reader/writer,
 the first transmitting unit is configured to read out the design information to transmit it in addition to the control parameter and the communication state data,
 the communication unit is configured to transmit the design information in addition to the control parameter and the communication state data through the network,
 the first receiving unit of the support server is configured to receive the design information in addition to the control parameter and the communication state data, and
 the determining unit of the support server is configured to determine the update control parameter based on the received control parameter, the communication state data, and the design information.

6. A support system according to claim 1, wherein the measuring unit is configured to measure, as the communication state data, transmitting characteristic data and receiving characteristic data, the transmitting characteristic data serving as an indicator of a state of transmitting data to the information carrier, the receiving characteristic data serving as an indicator of a state of receiving data from the information carrier.

7. A support system for a reader/writer capable of communications with an information carrier, the support system comprising:

a measuring unit configured to measure communication state data serving as an indicator of a state of the communications with the information carrier;

a first storage unit configured to store the communication state data and a control parameter required to the communications with the information carrier;

a determining unit configured to read out the communication state data and the control parameter to determine an update control parameter based on the readout control parameter and the communication state data; and a control unit configured to control the state of the communications with the information carrier based on the update control parameter and the measured communication state data.

8. A support system according to claim 7, further comprising:

an entry unit configured to enter use environment information representing an environment surrounding the reader/writer being used, wherein the determining unit is configured to determine the update control parameter based on the received control parameter, the communication state data, and the entered environment information.

9. A method for supporting a reader/writer capable of communications with an information carrier, the method comprising:

measuring communication state data serving as an indicator of a state of the communications with the information carrier;

storing the communication state data and a control parameter required to the communications with the information carrier;

reading out the communication state data and the control parameter to determine an update control parameter based on the readout control parameter and the communication state data; and controlling the state of the communications with the information carrier based on the update control parameter and the measured communication state data.

* * * * *